July 25, 1967   M. DIETZE ETAL   3,332,468
MIXING DEVICE WITH A HEATED JACKET
Filed June 23, 1965
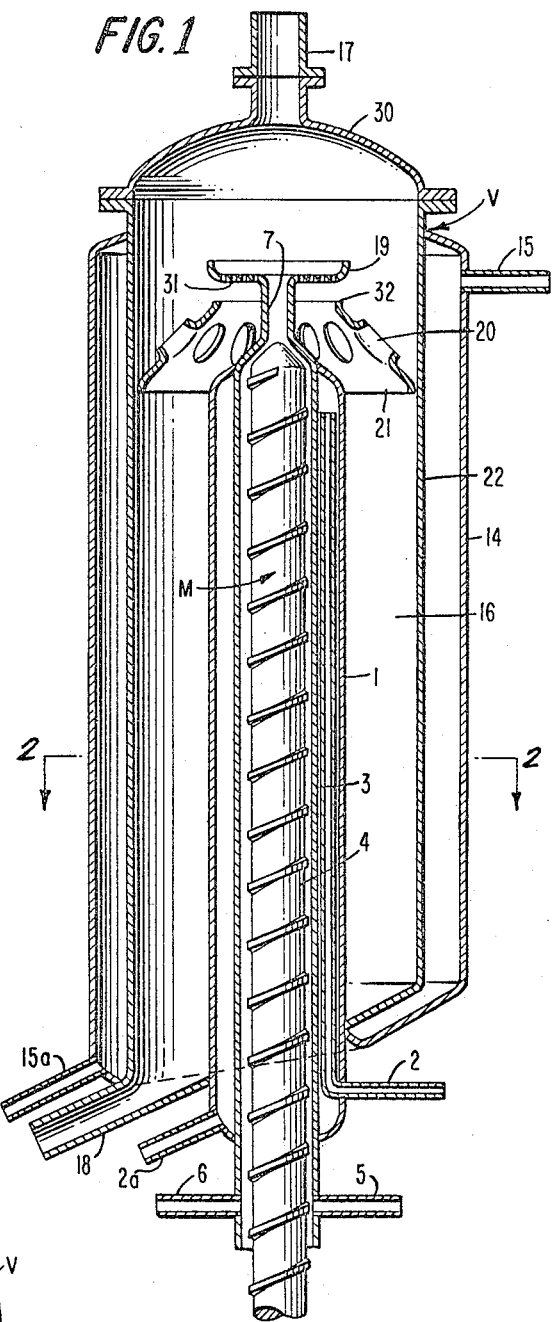
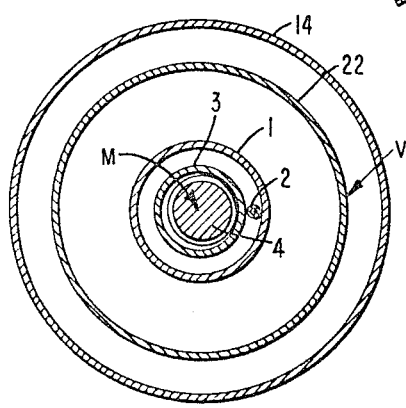
INVENTOR
MANFRED DIETZE
WOLFGANG KRAFT
BY Bair, Freeman & Molinare  ATTORNEY United States Patent Office 3,332,468
Patented July 25, 1967

3,332,468
MIXING DEVICE WITH A HEATED JACKET
Manfred Dietze, Offenbach (Main), and Wolfgang Kraft, Bad Vilbel, Germany, assignors, by mesne assignments, to Vickers-Zimmer Aktiengesellschaft, Planung und Bau von Industrieanlagen, Frankfurt am Main, Germany, a corporation of Germany
Filed June 23, 1965, Ser. No. 466,161
10 Claims. (Cl. 159—2)

ABSTRACT OF THE DISCLOSURE

A device useful for continuously mixing several materials including a casing wherein the materials are mixed by a mixing screw which is rotatable within the casing. An evaporator substantially encloses the casing. An outlet for the mixed material is provided in the casing and a distributor is at the outlet for directing liquid to the evaporator. An outlet is provided in the evaporator for permitting the discharge of non-evaporated materials and means are provided for permitting the escape of vaporized material from the evaporator.

This application is a continuation-in-part of our copending application Ser. No. 304,854 filed Aug. 27, 1963, now U.S. Patent No. 3,235,231.

This invention relates to a device useful for continuously mixing several substances and which includes a mixing screw in a casing provided with multiple inlet connecting pieces and one outlet connecting piece.

Such mixing devices are useful primarily in the chemical industry, as in plastics production, for homogeneously mixing several materials, as for example, a main substance and several additives. Additives to be mixed along with a main substance, for reasons of dosage, are often supplied in suspension and/or solution. Since the solvent or suspension medium often disturbs the continuous flow of the process, immediately after mixing, they must be removed. Such conditions, for example, are found in the plastics industry when viscous plastics are supplied with a suitble coloring pigment or with a matting material. A specific example of the necessity of immediate removal after mixing by evaporation of the suspension medium supplied with the additive is in the mixing of a suspension of titanium dioxide in ethylene glycol along with a polyester plastic, such as polyethylene terephthalate.

The above problem is overcome in a very simple and effective manner by arranging a mixer within an evaporator and directing the outlet of the mixer into an inner chamber of the evaporator. The evaporator is suitably a thin wall evaporator, whereby the outer wall of the mixer casing, which contains a heating jacket, forms a part of the evaporator surface.

It is therefore an object of this invention to provide an improved mixing device which effects the removal of undesirable substanecs, such as a solvent, from the mixed materials.

It is also an object of this invention to provide an improved mixing device which is characterized by its simplicity and economy of construction, manufacture, and use.

Further purposes and objects of this invention will appear as the specification proceeds.

A particular embodiment of the present invention is illustrated in the accompanying drawings wherein:

FIGURE 1 is a partially sectioned longitudinal view of the mixing device of the invention; and FIGURE 2 is a sectional view taken along the line 2—2 of FIGURE 1.

For mixing materials supplied to the mixing device there is provided a continuous mixer M which is of any suitable construction. In the embodiment shown in the drawing, the mixer contains a preferably cylindrical casing 3 having a central axis and surrounded by a heating jacket 1. For feeding and removing the heating medium, an inlet connecting piece 2 and an exit connecting piece 2a are provided in the jacket 1. Depending upon ultimate use, a heated jacket may or may not be used.

In the mixer casing 3, there is provided a mixing screw 4, advantageously a rotatably driven mixing screw. In the example shown, the mixing screw 4 is rotatably supported at only one place so that its shaft is rotatably guided in the cover of the casing 3 and may be packed by a packing box (not shown). It is also possible to support the mixing screw 4 on both of its ends. In any case however, it is desirable to construct the screw axis so that it rotates eccentrically, that is, so that the geometric screw axis is displaced eccentrically with respect to the rotating axis of the screw which is co-axial with the central axis of the casing. As set forth in our copending application Ser. No. 304,854, this arrangement provides a significant increase in the mixing output.

The materials to be mixed together are fed to the mixer through the connecting pieces 5 and 6. The connecting pieces 5 and 6 lead into the mixer casing 3 in the same cross sectional plane. It is to be understood, however, that they can lead into a plurality of cross sectional planes which are displaced relative to each other in flow direction, whereby the inlet connecting piece for the main stream, for example, may be located just at the beginning of the mixer. Thus, particularly when the inlet connecting piece for the additive stream is constructed as a ring surrounding the casing, an additional improvement in mixing output may be obtained.

In the embodiment shown, only the inlet connecting pieces for two media to be mixed together are provided. The number of inlet connecting pieces, however, depends on the number of media to be mixed. The materials fed into the mixer are guided through the casing 3 in a longitudinal direction and at the opposite end thereof, they are removed through the exit connecting piece 7 after intensive mixing effected by the screw 4.

For purposes of illustration, an additive may be added to the main stream through one of the entry connecting pieces, which additive, for reasons of dosage, is present in the form of a solution or suspension; the solvent or suspension means, however, is not to remain in the end product, but rather is to be evaporated immediately after the mixing operation has been terminated. As an example, in the mixing of a suspension of titanium dioxide in ethylene glycol along with molten polyethylene terephthalate, immediately after the mixing operation, the ethylene glycol is to be evaporated. According to the invention, this is achieved by locating the mixer M within an evaporator V, which desirably is arranged as a thin film or wall evaporator and which, immediately after the mixing operation, effects an evaporation of the undesired medium from the end mixed product.

As seen from the drawings, the mixer M is substantially enclosed by the evaporator V, whereby the exit connecting piece 17 leads directly into an inner room or chamber 16 of the evaporator. The evaporator wall 22 is surrounded by a heating jacket 14 which has an inlet connecting piece 15 and an outlet connecting piece 15a for feeding and withdrawing a suitable heating medium.

The substances to be mixed together, that is the main substance and the additives which are fed into the mixer in its lower zone through the connecting pieces 5 and 6, pass through the discharge connecting piece 7 as the mixed product. The discharge connecting piece 7 of the mixer forms a distribution plate 19 at its upper end, which divides the mixed substances into two partial streams, one stream being delivered to a liquid guide baffle 21. The liquid guide baffle 21 is preferably designed in frusto-conical form having an open top and a plurality of vapor passage openings 20 formed therein and distributed circumferentially thereon. The edges of the vapor passage openings 20 are raised upwardly so that the liquid running along the outer surface of the guide plate or baffle 21 does not flow through the vapor passage openings 20. The stream running down the outer surface of the liquid guide baffle 21 is conducted to the evaporator wall 22 and runs down along the wall in a thin film of liquid. The vapors formed escape through the vapor passage openings 20 and then through an exit connecting piece 17 located in the upper closing cover 30. A second stream of liquid from the distributor plate 19 passes through the holes 31 and then through the upper central opening 32 of the guide plate 21 to thus contact the outer surface of the heated jacket 1 of the mixing device. Here the liquid runs down in a thin layer and the vapors escape in the manner previously described.

Thus, the mixture passes in two paths of flow, with evaporation of the solvent or suspension means, respectively, into the lower region of the evaporator 16, where it is then discharged through the discharge connecting piece 18. Thus, the outer surface of the heated mixer wall is simultaneously used as an evaporator surface. As an alternative, if heating of the mixer during the mixing of the substances is not desired, the evaporation may be accomplished solely on the evaporator wall 22. In this case, the holes 31 in the bottom of the distributor 19 are omitted so that all of the mixed substances are conducted along the conical liquid guide plate 21.

The invention can be used in all cases in which a mixed product, after termination of mixing, shall be separated from a disturbing, evaporable excess material, and in addition to the above, may be from a reaction product created during the mixing operation.

While in the foregoing there has been provided a detailed description of a particular embodiment of the present invention, it is to be understood that all equivalents obvious to those having skill in the art are to be included within the scope of the invention, as claimed.

What we claim and desire to secure by Letters Patent is:

1. A device useful for continuously mixing several materials, said device comprising a casing wherein said materials are mixed and having a central axis, a mixing screw having a geometrical axis and being mounted within said casing for rotation about an axis of rotation, said axis of rotation being co-axial with said central axis and said geometrical axis being offset from and substantially parallel to said axis of rotation, and evaporator means substantially enclosing said casing whereby certain of said materials are vaporized following said mixing.

2. The device for claim 1 wherein said casing terminates in a distributor portion which includes means for conducting the mixed material to said evaporator means.

3. The device of claim 2 wherein a baffle is positioned below said distributor and conducts a liquid from said distributor to said evaporator means.

4. The device of claim 3 wherein said baffle includes a plurality of openings for passing vapors upwardly therethrough while including means for substantially avoiding the passage of liquid downwardly therethrough.

5. A device useful for continuously mixing several materials, said device comprising a casing wherein said materials are mixed, a mixing screw rotatably mounted within said casing for mixing said materials, evaporator means substantially enclosing said casing, a first outlet for the mixed materials in said casing, distributor means for said mixed materials at said first outlet for directing liquid from said distributor to said evaporator means, a second outlet in said evaporator means for permitting the discharge of non-evaporator materials, and means for permitting the passage of vaporized materials from said evaporator means.

6. The device of claim 5 wherein said distributor means includes a distributor portion for directing said mixed materials to said evaporator, a baffle positioned below said distributor including means for conducting liquid from said distributor portion to said wall, and a plurality of openings in said baffle for passing vaporized materials upwardly therethrough while including means for substantially avoiding the passage of liquid downwardly therethrough.

7. The device of claim 5 wherein said casing is enclosed by a heated jacket, and said distributor means directs a portion of said mixed materials to said heated jacket for vaporizing certain of said materials.

8. A device useful for continuously mixing several materials, said device comprising a casing wherein said materials are mixed, a mixing screw rotatably mounted within said casing for mixing said materials, a heated jacket surrounding said casing, evaporator means surrounding said casing and said jacket, an outlet in said casing for permitting the escape of mixed materials from said casing, means for directing one portion of said mixed materials to said evaporator means and another portion to said heated jacket in order to effect vaporization of certain of said mixed substances, means for permitting the escape of non-evaporated materials from said evaporator means, and means for permitting the escape of vaporized materials from said evaporator means.

9. A device useful for continuously mixing several materials, said device comprising a casing wherein said materials are mixed, a mixing screw rotatably mounted within said casing for mixing said material, an outlet at one end of said casing for permitting the escape of mixed materials from said casing, a heated jacket surrounding said casing, evaporator means surrounding said casing and said jacket, a distributor plate connected to said outlet and having a raised outer edge and apertures whereby one portion of said mixed materials passes downwardly through said apertures while another portion passes over said raised edge and then downwardly, a baffle plate positioned between said evaporator means and said casing and below said distributor, an annular opening at the upper end of said baffle plate for passing said one portion to said heated jacket for vaporization of certain of said materials, said baffle plate including means for directing said another portion to said evaporator means for vaporization of certain of said material, outlet means positioned between said casing and said evaporator means for discharging non-evaporated materials from said device, and apertures in said baffle plate for permitting the escape of evaporated substances upwardly therethrough.

10. The device of claim 9 wherein the apertures in said conical plate have upwardly raised rims to substantially avoid the passage of liquids therethrough.

References Cited

UNITED STATES PATENTS

| | | | |
|---|---|---|---|
| 1,567,455 | 12/1925 | Newton | 202—237 |
| 3,023,456 | 3/1962 | Palfey | 18—12 |
| 3,087,253 | 4/1963 | Wulf | 165—155 X |
| 3,097,126 | 7/1963 | Koeffler | 165—155 X |
| 3,177,272 | 4/1965 | Plymale | 18—12 |
| 3,193,877 | 7/1965 | Edwards | 18—12 |

ROBERT A. O'LEARY, *Primary Examiner.*

MEYER PERLIN, *Examiner.*

A. W. DAVIS, *Assistant Examiner.*